(12) United States Patent
Martz

(10) Patent No.: US 7,803,446 B2
(45) Date of Patent: Sep. 28, 2010

(54) CONSTRUCTION OF CARPET WITH BREATHABLE MEMBRANE FOR ELIMINATING MOISTURE FROM SURFACE COVERED BY THE CARPET

(76) Inventor: Joel D. Martz, 5 Sealy Dr., Lawrence, NY (US) 11559

( * ) Notice: Subject to any disclaimer, the term of this patent is extended or adjusted under 35 U.S.C. 154(b) by 62 days.

(21) Appl. No.: 10/702,098

(22) Filed: Nov. 5, 2003

(65) Prior Publication Data

US 2004/0146689 A1 Jul. 29, 2004

Related U.S. Application Data

(60) Provisional application No. 60/424,246, filed on Nov. 6, 2002.

(51) Int. Cl.
  *B32B 3/00* (2006.01)
  *B32B 3/24* (2006.01)
  *D05C 17/02* (2006.01)

(52) U.S. Cl. ............ 428/95; 428/138; 428/137; 428/131

(58) Field of Classification Search ............ 428/95, 428/131, 137, 138, 134, 135, 136
See application file for complete search history.

(56) References Cited

U.S. PATENT DOCUMENTS

| 5,612,113 | A | | 3/1997 | Irwin |
| 5,656,167 | A | | 8/1997 | Martz |
| 2002/0142126 | A1 | * | 10/2002 | Higgins et al. ............ 428/95 |
| 2004/0146689 | A1 | * | 7/2004 | Martz ............ 428/95 |
| 2005/0064136 | A1 | * | 3/2005 | Turner et al. ............ 428/131 |

FOREIGN PATENT DOCUMENTS

WO    WO 0198575 A1 * 12/2001

* cited by examiner

*Primary Examiner*—Cheryl Juska
(74) *Attorney, Agent, or Firm*—Malloy & Malloy, P.A.

(57) ABSTRACT

A carpet has a layer of tufting supported on a primary backing layer. A breathable membrane is disposed along an interface between the primary backing layer and a secondary backing layer. A breathable membrane is disposed along an interface between the tufting layer and the backing layer, and adhesively secures the layer of tufting to the backing layer. The breathable membrane is permeable to water vapor but impervious to liquid water, while both the tufting layer and the backing layer are permeable to water vapor. In an alternative embodiment of the invention, a laminated barrier which includes the membrane, may be made of fibers, yarns, cross-laid scrim, or plastic netting, and the breathable membrane may be protected from abrasion with a floor by means of an apertured film laminated to the membrane.

18 Claims, 1 Drawing Sheet

CONSTRUCTION OF CARPET WITH BREATHABLE MEMBRANE FOR ELIMINATING MOISTURE FROM SURFACE COVERED BY THE CARPET

RELATED APPLICATION

This application is based on and claims right of priority in a provisional patent application having Ser. No. 60/424,246 filed Nov. 6, 2002.

BACKGROUND OF THE INVENTION

This invention relates to a construction of carpet, suitable for the covering of a floor, wherein an impervious/moisture eliminating membrane is disposed between an upper layer of tufting and a lower backing layer or within the lower backing layer, the membrane being impervious to the penetration of liquids, and wherein the membrane is breathable for elimination of water vapor (moisture) from below the membrane.

Liquid penetration of carpets presents a difficult situation for anyone who keeps a dog or a cat as a pet. It is also an issue in healthcare facilities where penetrations of blood, urine or other bodily fluids into and through a carpet are problems. In hospitality applications, such as restaurants, stain penetration is a constant dilemma. Strike-back of stains after carpet cleaning in all situations is a recognized problem.

Attempts at solving the foregoing problems in residential applications have included rollout film barriers placed either separately on top of the carpet padding or adhered to the top of the padding. In industrial or institutional applications, use of impervious closed cell foam backing has been attempted. Either of these modes of carpet construction has been found to lead to a trapping of moisture below the carpet, which situation is understood to be a contributor to the growth of mold and fungus, and is recognized in professional and lay literature as a major health problem. It is well understood that environments presenting darkness and entrapped moisture promote the growth of mold and fungus. As an alternative attempt at solving the foregoing problems, it has been suggested that a barrier be placed below the carpet backing in contact with the floor. This exposes the barrier to abrasion and does not address the problem of entrapped moisture and promotion of mold growth. In the case of institutional applications, such carpeting is most often adhesively secured directly on top of concrete that is susceptible to holding a high concentration of moisture. In addition to the contribution to microbial growth, trapping of moisture contributes to adhesive breakdown

SUMMARY OF THE INVENTION

The aforementioned problems are overcome and other advantages are provided by a construction of carpet, in accordance with the invention, wherein the carpet has a layer of tufting supported on a primary backing layer. A breathable membrane is disposed along an interface between the primary backing layer and a secondary backing layer. The breathable membrane is permeable to water vapor but impervious to liquid water, while both the tufting layer and the backing layers are permeable to water vapor. In an alternative embodiment of the invention, a laminated barrier which, includes the membrane, may be made of fibers or cross-laid scrim, and the breathable membrane may be protected from abrasion with a floor by means of an apertured film laminated to the membrane. There is a strengthening of the laminated composite of membrane and film by the layer of scrim in contact with the membrane. In the event that a breathable membrane can be constructed with inherent resistance to damage from abrasion, the backing layer on the underside of the carpet may be omitted.

Typically, a water-based latex/mineral filled emulsion stabilizes the tufting, and is applied on the back side of the "carpet primary" layer. Such emulsions dry as composites which create mostly mechanical bonding within the fibers exposed on the underside of the "carpet primary" layer and on the fibers of the fabric or substrate into which the carpet face yarns are tufted or inserted. To the latex emulsion is added a water-based adhesive emulsion which may be thermoplastic, this achieving excellent lamination, of the film to the carpet primary back surface. The manufacturing step of curing of the composite emulsion results in the aforementioned breathable membrane along the interface between the tufting and the backing layers of the carpet.

BRIEF DESCRIPTION OF THE DRAWING

The aforementioned aspects and other features of the invention are explained in the following description, taken in connection with the accompanying drawing figures wherein.

Identically labeled elements appearing in different ones of the figures refer to the same element but may not be referenced in the description for all figures.

DETAILED DESCRIPTION OF THE INVENTION

Figure 1:
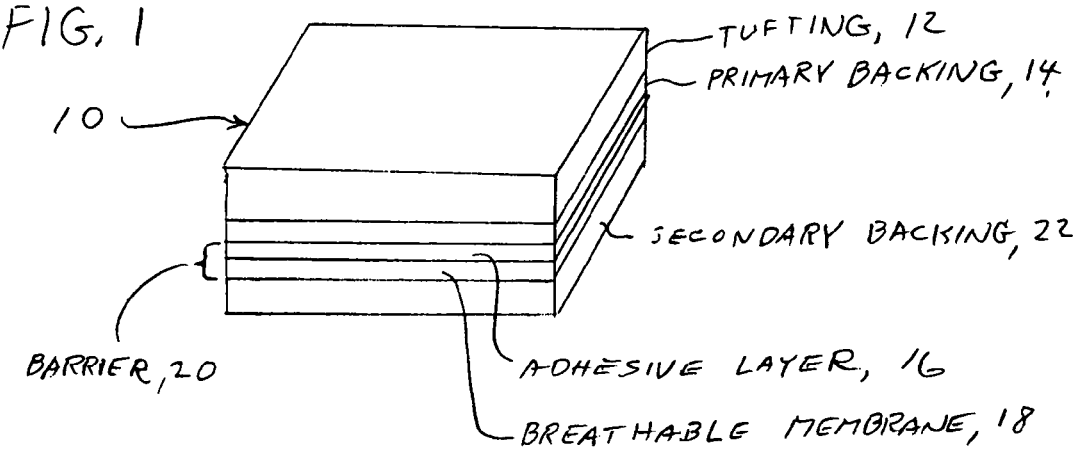
FIG. 1 shows a stylized view of a section of carpet constructed in accordance with a first embodiment of the invention.

FIG. 1 shows a section of carpet 10 composed of a layer of tufting 12 secured to a primary backing 14, the backing 14 being fabricated typically of a fabric. The tufting is preferably a solution dyed nylon which is inserted into the backing with latex coating on the underside of the backing 14. Beneath the primary backing 14, a layer of adhesive 16 secures the primary backing 14 to a breathable membrane 18. The layer of adhesive 16 is a breathable or discontinuous adhesive layer. The adhesive layer 16 and the breathable membrane 18 constitute a barrier 20 to a flow of liquid, such as water and fluids of the human (or animal) body, while being pervious to a flow of moisture. A secondary backing 22, which may be fabricated of a fibrous material, is secured to the membrane 18 at the bottom surface of the carpet 10. Upon a placing of the carpet on a floor, with the secondary backing 22 in contact with the floor, moisture that may be present in the floor is able to escape by propagating through the barrier 20 to the tufting 12 at the top surface of the carpet 10, then to be carried away in the environmental air.

Current backings, suitable for the secondary backing 22, are substitutes of jute appearing materials or woven materials. An example of such backing is available commercially under the name "Action Back"® (BP-Amoco). Such backing is currently adhered onto the primary tufted carpet material backing with additional binder. As a further example of the backing, Connect® Cross-laid scrim (Conwed Plastics or Bayex) may be substituted for Action Back.

Figure 2:
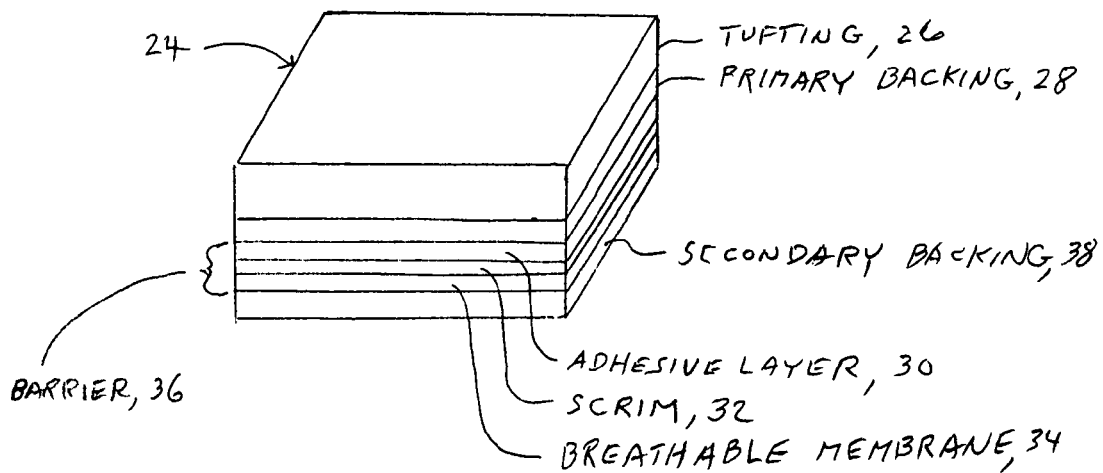
FIG. 2 shows a stylized view of a section of carpet constructed in accordance with a second embodiment of the invention.

FIG. 2 shows a section of carpet 24 composed of a layer of tufting 26 secured to a primary backing 28, the backing 28 being fabricated typically of a fabric. Beneath the primary backing 28, a layer of adhesive 30 secures the primary backing 28, via a layer of scrim 32, to a breathable membrane 34.

The scrim 32, in conjunction with the adhesive layer 30 and the breathable membrane 34, constitute a barrier 36 to a flow of liquid, such as the aforementioned water and fluids of the human (or animal) body, while being pervious to a flow of moisture. The tufting and the adhesive of the carpet 24 is the same as is employed in the carpet 10. The scrim 32 is a cross laid scrim (e.g. Connect®), woven fibers or "Action Back®" yarn. A secondary backing 38, which is fabricated preferably of an apertured film (such a film being, available commercially under the name: Delnet®, Delstar Corporation), is laminated to the membrane 34 at the bottom surface of the carpet 24. Upon a placing of the carpet 24 on a floor, with the secondary backing 38 in contact with the floor, moisture that may be present in the floor is able to escape by propagating through apertures in the film of the secondary backing 38, and by propagating through the barrier 36 to the tufting 26 at the top surface of the carpet 24, then to be carried away in the environmental air. The terms "top" and "bottom" are presented for convenience in describing the carpet as presented in FIGS. 1 and 2; however, it is understood that the carpet may have an orientation other than that presented in the drawing.

As described above, in both embodiments of the invention, FIGS. 1 and 2, there is a tufting layer 12, 26 with which a user of the carpet 10, 24 makes contact with the carpet, as by walking on the carpet. The tufting may be made of a material which is comfortable for contact by a person, and may provide a surface which impedes slipping by a person walking on the carpet. Such material may be selected without constraints on being pervious or imperious to water. Beneath the tufting layer is the breathable membrane 18, 34 which is impervious to the flow of liquid water, but is pervious to the flow of water vapor. Thus, the breathable membrane is capable of preventing a flow of water onto a floor covered by the carpet, in the event of a spilling of water on the carpet. Furthermore, if the floor becomes damp from long exposure to water vapor, by way of example, in the event that the carpet is not dried after a spill, the breathability of the membrane allows the floor, covered by the carpet, to dry out by passage of water vapor through the membrane after the carpet has been allowed to dry. The layer of secondary backing 22, 38 protects the back side of the membrane 18, 34 from abrasion during a laying of the carpet on the floor, and from any sliding along the floor which may occur during use of the carpet. In the embodiment of the carpet 24 in FIG. 2, the layer of scrim 32 provides added dimensional stability. The scrim 32 may be constructed as a layer of woven fibers or have the form of a cross laid scrim. A description of scrim is provided in Martz, U.S. Pat. No. 5,656,167. By way of alternative embodiment of the invention, it is noted that, in place of the scrim 32, the carpet may be constructed of plastic netting or a grid of plastic, such as a commercially available plastic netting, Thermo Net®, by Conwed Plastics.

Both of the foregoing embodiments, FIGS. 1 and 2, are constructed with features in accordance with the invention. Thus, there is a placement of a barrier directly below the fabric of the primary backing (or face) of the carpet, but above the secondary backing that may be constructed of a synthetic (polypropylene) or other polymeric or natural material. The secondary backing can also be a foam or similar carpet padding laminated to other layers of the carpet. The attributes and composition of breathable membranes, such as that employed in the present carpets, has been described previously in Martz, U.S. Pat. No. 5,656,167. The membrane may be a microporous membrane, a monolithic membrane or a combination of both in one membrane, and may be referred to as a Hybrid Microporous/Monolithic Impervious Moisture Eliminating Membrane. In each of the two embodiments of the invention, the primary and secondary backing layers serve to protect the breathable membrane, which is impervious to flow of water, from abrasion or physical damage during shipment and installation. The construction of the carpet allows for a liquid-tight sealing of a cut backing by means of tape or other method during seaming of a carpet.

By way of alternative embodiment, stabilizing yarns or filaments, as either woven or non-woven fabric, can be placed in a layer below or above the membrane but below the tufting backing to aid in providing dimensional stability to the carpet. One may also laminate an impervious/moisture eliminating film to a foam or similar padding, and bond this composite with the film facing the carpet primary below the tufting. This would provide often desired cushioning below the carpet, protect the foam from liquid absorption from penetrating liquids from above but allow moisture elimination from below to aid in the prevention of mold and fungus formation below the carpet system.

Furthermore, it is noted that liquid substances, such as stain inducing materials alone or as later influenced by added surfactants during cleaning efforts, will have inherent surface tension and viscosity influences on the performance of the membrane. Soaps, for example, function by lowering surface tension of a liquid that aids in stain removal. However, the membrane can be formulated to work with the liquids of reduced surface tension so as to retain moisture eliminating capability while preventing a flow of liquid through the carpet to the underlying floor.

These membrane performance phenomena are influenced by factors as expressed in the following formula:

$$BPP=4ST(COS\ Theta)/D$$

wherein:
BPP=Bubble Point Pressure
ST=Surface Tension
COS Theta=wetting angle of the membrane or barrier material
D=diameter of a pore From this formula and this principle it is understood that the protective ability of a barrier or membrane may be compromised by lowering surface tension of the challenging liquid or by an aberrant oversized pore. Therefore, it is essential when qualifying the penetration resistant protective quality of an impervious barrier, that all liquids that may challenge, and all possible in-use alterations to the liquids should be tested to insure that the barrier is impervious to the flow of liquid. In other words, the barrier membrane should also be tested with all low surface tension liquids such as alcoholic beverages and additives to the challenging liquid, such as soaps, that alter the resultant surface tension of the liquid challenge. This formula demonstrates that by lowering the surface tension of a challenge liquid, there is a lowering of "Bubble Point" (the pressure needed to overcome the liquid hold-out ability of a barrier or membrane at an air-liquid interface).

The CDC, OSHA, ISO and other regulatory agencies recognize that blood and other bodily liquids may contain blood borne pathogens that are health hazards. Penetration of urine below healthcare carpeting presents odor and other persistent problems. It should be noted that the surface tension of blood and other bodily liquids is less than common tap water. Actually, OSHA regulations call for the cleaning or removal of all biohazards namely, contaminated surfaces due to penetrating bodily fluids that can penetrate below the carpet. The performance requirements for such barriers have been established by professional standards committees such as ASTM (Standard 1670/71) and have been adopted by governmental agencies such as the FDA. It is probable that building codes for healthcare facilities would adopt such a barrier as a requirement if a cost-effective carpet product could be established. Replacement cost savings' alone would probably render such a product as cost effective. Industry has successfully accomplished cost-effective impervious breathable barriers for products such as surgical gowns that meet these regulatory standards. This proven breathable membrane technology and technical performance as stated in ASTM 1670/1671 may define, as one example, membrane quality that may be applied to membranes incorporated into healthcare carpeting. Scientists in membrane technology have shown the ability to meet the challenge of proposed technical performance standards. The membrane should also hold out water and soap solution typically used in carpet cleaning. A typical test for assessing this impervious quality may be determined by utilizing a test method used to qualify the impervious quality of industrial fabrics. For example, ASTM 903 with a challenge pressure of 0.25 PSI or AATCC 1127 with a head pressure rating of 50 cm. could be chosen as typical challenges to warrant the term "impervious". Since surface tension of a challenging liquid would influence the results of testing by these methods, and since in-use challenges to carpets will present various liquid challenges, it is important to establish test liquids with stated surface tensions. For purposes of expediting the test, the membrane layer alone or adhered as a backing may be tested without the carpet tufting.

The capability to measure moisture elimination can be determined also by a standard textile test methods used to assess Moisture Vapor Transmission Rates (MVTR). An example of this test method would be ASTM E96, particularly the "up cup" method in which water would be contained in a cup below a carpet sample. The backing would be sealed to the open cup below it. The measure of water loss passing outward through the carpet backing from the cup in 24 hours, extrapolated to grams per square meter, expresses a moisture vapor transmission rate. This would simulate the capability for moisture elimination from below, e.g. a confined basement area. It is well understood that not all films have the capability of being simultaneously impervious and moisture eliminating (breathable). For example, typical polyethylene film in a range of 0.5-3 mils thickness as sold for food storage or trash bags is impervious to liquid penetration but provides poor moisture elimination (breathability). When measured by the standard test method above, such film would provide a moisture vapor transmission rate of only 10-50 grams/square meter/24 hours when measured by Test Condition E96 Up Cup Method at 72 degrees F. and 50% Relative Humidity. The film would be considered as not "breathable".

As used herein, a breathable membrane that is impervious to liquid possesses the simultaneous capability to meet both of the following conditions. The membrane is impervious if there is no liquid penetration by Test method ASTM 903 with a Pressure of 0.5 to 2.0 PSI with challenge liquids with Surface Tensions of 22.3-72.8 dynes/cm at 20 degrees C. The membrane is breathable, or moisture eliminating, if the moisture vapor transmission rate of water through the membrane is in the range of 50-2000 grams/square meter/24 hours by Test Method ASTM E96, Up-Cup Method with ambient conditions of 23 degrees C. and a Relative Humidity of 50%.

In accordance with the construction of a carpet embodying the invention, the ideal carpet product would incorporate a breathable liquid impervious (Moisture Vapor Permeable) membrane directly below the carpet tufting. Ideally, but not necessarily, such carpet tufting would be of a Solution Dyed Fiber to resist staining. This would allow steam cleaning extraction of stains down to the practical base of the carpet tufting. Typically, a water-based latex/mineral filled emulsion stabilizes the tufting. Such emulsions dry as composites which create mostly mechanical bonding within the fibers exposed on the underside of the carpet primary backing and on the fibers of the fabric or substrate into which the carpet face yarns are tufted or inserted. These commonly used latex emulsions form poor adhesion to added film barriers which may be laminated to it. Irwin, U.S. Pat. No. 5,612,113, speaks directly to the need of using an additional nonaqueous laminating adhesive to secure films to a carpet. It is advantageous to choose from a class of breathable impervious moisture eliminating films (for example made from "breathable" Urethane resins (e.g. Noveon, Estanes®), and mix commercially available water based adhesive emulsions which may be thermoplastic (e.g. from Soluol Chemical Company, Warwick, R.I.) into the latex emulsion on the back side of the carpet primary backing and achieve excellent lamination of the film to the carpet primary back surface. With respect to the carpets shown in FIGS. 1 and 2, each of the adhesive layers 16 and 30 may be fabricated as a mixture of water based adhesive emulsion and latex emulsion.

This may be accomplished by nipping the Impervious/Moisture Eliminating backing during the latex emulsion drying process in a long drying box commonly called in the carpet industry, a Tenter Framer. More ideally, since the latex emulsion with added thermoplastic compatible adhesive in the emulsion remains tacky while hot as it exits the hot Tenter Framer, the Impervious. Moisture Eliminating Backing will be laminated excellently to the thermoplastic surface by nip pressure alone upon contact with the hot tacky surface of the exposed primary backing even though it is dried. Adequate permanent bonding lamination occurs when the thermoplastic adhesive portion cools below a temperature called the glass transition point. Alternatively, a breathable or discontinuous water based adhesive layer may be juxtaposed between the layer of latex binder and the membrane. One may also coat adhesive during carpet manufacture or pre-coat the membrane with a breathable water-based thermoplastic or a discontinuous thermoplastic adhesive before lamination of the membrane to the latex or tufting backing.

The foregoing construction of carpet alleviates problems associated with prior technology in carpeting. A breathable-film rollout product has been offered on the market for residential carpets. (e.g. Spillnet®, DuPont). It is rolled out above padding which may underlay the carpet. Although the product addresses the moisture entrapment problem, it has been deemed by carpet professionals as cumbersome to apply and affix, and does not address the root problem of preventing any liquid from penetrating through the carpet backing itself. In this case, the offensive stain or liquid is trapped above the pad but below the carpet. Since the film is separate from the carpet, liquid which has penetrated through the carpet tends to flow along the top surface of the film and collect in pools. The same would be true if an impervious/moisture eliminating breathable film was laminated on top of the carpet padding. However, in the case of the present carpet, as portrayed in FIGS. 1 and 2, the breathable membrane is laminated to other component layers of the carpet, thereby preventing any flow of water along a surface of the breathable film. There is no pooling of spilt liquid in the carpet 10, 24, and any spilt liquid is therefore readily evaporated through the tufting.

In the typical case of carpeting over carpet padding in the prior art, even though the stain is removed, the stain often reappears. In such cases, the stain that is solubolized in some solvent, including water, with a surfactant (soap) during cleaning, is extracted from above through the tufting. But the liquefied stain sinks below through the carpet backing and saturates into or is entrapped within the padding or pools between the padding and the carpet backing. When the carpet above dries, it draws back the solvent, which now contains re-stainable residue upward into the carpet and the stain reappears. This is called in the carpet business, "strike-back". The present invention, as noted above, inhibits the pooling, and therefore is unlikely to stain.

Within recent years, technical advances have been made in carpet fiber technologies by the introduction of Solution Dyed Fibers (for example, solution dyed nylons, such as the product commercially available under the name: BASF ZEFTRON®) that encase the pigments within the fiber. These fibers have proven to be so resistive to staining that carpet fiber producers and carpet companies are offering as much as 25 year guarantees, where they would replace the entire carpet installation if the stain cannot be removed.

It is to be understood that the above described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. A carpet comprising:
   a layer of tufting;
   a primary backing layer receiving tufting of the tufting layer;
   a breathable membrane impervious to liquid, and a further abrasion-protective backing layer for protecting the membrane from abrasion, the membrane being located between the primary layer and the further backing layer, and wherein both the tufting layer and the primary backing layer are permeable to water vapor,
   a breathable stabilizing layer in contact with the breathable membrane for dimensional stability of the membrane and the carpet;
   wherein the further abrasion-protective backing layer comprises an apertured film laminated to the membrane on a side thereof opposite the tufting layer; and
   wherein the further abrasion-protective backing layer is composed of breathable material disposed on a side of the membrane opposite the tufting layer for allowing transport of water vapor through the carpet from a floor covered by the carpet while protecting the membrane from abrasion caused by contact of the carpet with the floor.

2. A carpet according to claim 1, wherein the stabilizing layer consists essentially of interconnected yarns or fibers, plastic netting, or a grid of plastic.

3. A carpet according to claim 2, wherein the stabilizing layer comprises interconnected yarns having the form of cross-laid scrim or woven fibers.

4. A carpet according to claim 2, further comprising an adhesive disposed between the primary layer and the membrane.

5. A carpet according to claim 4, wherein the adhesive is a layer fabricated as a water based adhesive emulsion.

6. A carpet according to claim 1, further comprising an adhesive disposed between the primary layer and the membrane.

7. A carpet according to claim 6, wherein the adhesive is a layer fabricated as a water based adhesive emulsion.

8. A carpet according to claim 2, wherein the stabilizing layer comprises interconnected yarns having the form of cross-laid scrim, or interconnected fibers that are woven or nonwoven fibers.

9. A carpet according to claim 2, further comprising an adhesive disposed between the primary layer and the stabilizing layer.

10. A carpet according to claim 9, wherein the adhesive is a layer fabricated as a water based adhesive emulsion.

11. A carpet according to claim 1, wherein the stabilizing layer comprises interconnected yarns having the form of cross-laid scrim, or interconnected fibers that are woven or nonwoven fibers.

12. A carpet according to claim 11 wherein said further backing layer is a synthetic material, a polymeric material, or a natural material.

13. A carpet according to claim 1 wherein the breathable membrane has a resistance to liquid penetration under a pressure of 0.5 to 2.0 PSI for challenge liquids with surface tensions of 22.3-72.8 dynes/cm at 20 degrees C. by Test method ASTM 903, and wherein the breathable membrane has a moisture vapor transmission rate of water through the membrane in a range of 50-2000 grams/square meter/24 hours by Test Method ASTM E96, Up-Cup Method with ambient conditions of 23 degrees C. and a Relative Humidity of 50%.

14. A carpet comprising:
   a layer of tufting;
   a primary backing layer receiving tufting of the tufting layer;
   a breathable membrane impervious to liquid, the membrane being located on a side of the primary backing layer opposite the tufting layer, and wherein both the tufting layer and the primary backing layer are permeable to water vapor; and
   a further backing layer comprising a breathable apertured film for protecting the membrane from abrasion, the further backing layer being disposed on a side of the membrane opposite the primary backing layer for allowing transport of water vapor through the carpet from a floor covered by the carpet while protecting the membrane from abrasion caused by contact of the carpet with the floor.

15. A carpet according to claim 14 wherein the breathable membrane is laminated to the primary backing layer.

16. A carpet according to claim 14 further comprising an adhesive disposed between the primary backing layer and the breathable membrane for securing the breathable membrane to the primary backing layer.

17. A carpet according to claim 14 further comprising a stabilizing layer located between said primary backing layer and said breathable membrane for dimensional stability of the carpet, wherein the stabilizing layer consists essentially of interconnected yarns or fibers, plastic netting, or a grid of plastic.

18. A carpet according to claim 17 wherein the stabilizing layer comprises interconnected yarns having the form of cross-laid scrim, or interconnected fibers that are woven or nonwoven fibers.

* * * * *